United States Patent
Hamaguchi

(10) Patent No.: US 7,895,836 B2
(45) Date of Patent: Mar. 1, 2011

(54) SHAPE MEMORY ALLOY ACTUATOR, APPARATUS FOR MANUFACTURING SHAPE MEMORY ALLOY ACTUATOR, METHOD FOR STRINGING SHAPE MEMORY ALLOY, AND METHOD FOR MANUFACTURING SHAPE MEMORY ALLOY ACTUATOR

(75) Inventor: Kouji Hamaguchi, Osaka (JP)

(73) Assignee: Konica Minolta Holdings, Inc., Tokyo (JP)

( * ) Notice: Subject to any disclaimer, the term of this patent is extended or adjusted under 35 U.S.C. 154(b) by 216 days.

(21) Appl. No.: 12/038,940

(22) Filed: Feb. 28, 2008

(65) Prior Publication Data

US 2009/0133398 A1 May 28, 2009

(30) Foreign Application Priority Data

Mar. 5, 2007 (JP) .............................. 2007-053921
Feb. 25, 2008 (JP) .............................. 2008-042687

(51) Int. Cl.
*F01B 29/10* (2006.01)
*F02G 1/04* (2006.01)
*B23H 1/00* (2006.01)
*G03B 17/00* (2006.01)

(52) U.S. Cl. .............................. 60/528; 60/527; 60/529; 219/68; 396/52

(58) Field of Classification Search .......... 219/68–69.2, 219/78.15, 124.21; 60/527–529
See application file for complete search history.

(56) References Cited

U.S. PATENT DOCUMENTS

| 2,667,557 | A | * | 1/1954 | Herzog | 219/68 |
| 3,740,517 | A | * | 6/1973 | Lauer | 219/68 |
| 2006/0207250 | A1 | * | 9/2006 | Komori et al. | 60/527 |

FOREIGN PATENT DOCUMENTS

| JP | 2006-337533 A | | 12/2006 |
| JP | 2007-162612 A | * | 6/2007 |

* cited by examiner

*Primary Examiner*—Thomas E Denion
*Assistant Examiner*—Christopher Jetton
(74) *Attorney, Agent, or Firm*—Sidley Austin LLP

(57) ABSTRACT

A method of string an SMA, method of manufacturing the SMA actuator, SMA actuator and apparatus for manufacturing the SMA actuator, wherein a drive member made up of an SMA is extended between a moving member and wire supporting member via a drive member supporting member, and current is applied to the unnecessary portion of the drive member located between the wire supporting member and drive member supporting member, whereby the unnecessary portion of the drive member is cut off by melting, with the result that the size of the protrusion left behind after cutting of the SMA is reduced, and there is no need of giving consideration to the durability of a cutter otherwise used for cutting purposes.

8 Claims, 5 Drawing Sheets

US 7,895,836 B2

SHAPE MEMORY ALLOY ACTUATOR, APPARATUS FOR MANUFACTURING SHAPE MEMORY ALLOY ACTUATOR, METHOD FOR STRINGING SHAPE MEMORY ALLOY, AND METHOD FOR MANUFACTURING SHAPE MEMORY ALLOY ACTUATOR

This application is based on Japanese Patent Application No. 2007-053921 filed on Mar. 5, 2007, and No. 2008-042687 filed on Feb. 25, 2008, in Japanese Patent Office, the entire content of which is hereby incorporated by reference.

TECHNICAL FIELD

The present invention relates to a method for stringing a shape memory alloy, method for manufacturing a shape memory alloy, shape memory alloy actuator, and apparatus for manufacturing a shape memory alloy actuator; particularly to a method of stringing the shape memory alloy, method of manufacturing a shape memory alloy actuator, shape memory alloy actuator, and apparatus for manufacturing a shape memory alloy actuator, wherein there is no remainder of the wire or tape made up of a shape memory alloy after having been cut off, and there is no need of giving consideration to the durability of the cutter used for the cutting operation.

BACKGROUND

In recent years, a digital camera function has come to be incorporated in the mobile equipment such as a mobile phone. Furthermore, such sophisticated functions as auto-focusing function and handshake compensation function have also come to be mounted thereon. This trend has required the development of a microminiaturized actuator for moving a pickup lens and image pickup device. Thus, various forms of actuators to take the place of the conventional motor and gear train have been proposed. Of these, the actuator capturing the spotlight of the industry is the SMA actuator using a shape memory alloy (hereinafter referred to as "SMA").

The following briefly describes the basic arrangement and operation of the SMA actuator with reference to FIGS. 4a, 4b and 4c, wherein an example is taken from the conventional SMA actuators. FIGS. 4a, 4b and 4c are schematic diagrams showing the basic arrangement and operation of the conventional SMA actuator.

In FIG. 4a, the SMA actuator 1 contains a drive member supporting member 11, fixing portions 13 and 15 as part of the supporting member 11, drive member 17, moving member 21, protrusion 23, bias member 31 and bias member fixing portion 33. The bias member 31 and bias member fixing portion 33 serve as a bias section of the present invention.

The moving member 21 that moves a driven member by mounting the driven member (not illustrated) or by engagement with the driven member is biased by a bias member 31 made up of a spring and others in the direction of being pulled by the bias member 31, namely, toward the right in the drawing, and is connected to the bias member fixing portion 33. In the meantime, the drive member 17 made up of SMA wire is extended between the protrusion 23 arranged on the moving member 21 and the drive member supporting member 11 arranged in the direction face to face with the bias member 31 with the moving member 21 kept sandwiched in-between, so that tension is applied to the moving member 21 in the direction against the biasing force of the bias member 31, namely, toward the left in the drawing. The drive member 17 is secured onto the drive member supporting member 11 at the fixing portions 13 and 15. The moving member 21 stops at the position where the biasing force of the bias member 31 is balanced with the tension of the drive member 17.

In FIG. 4b, when an electric current is applied to the drive member 17 in the direction marked by an arrow 41, the drive member 17 generates Joule heat by its own resistance, and is transformed in the state of higher elastic coefficient. In this case, the drive member 17 shrinks to get back to the length memorized at the time of high temperature due to the properties of SMA. Then tension is applied to the moving member 21 in the leftward direction through the protrusion 23. This tension causes the moving member 21 to move to the left against the biasing force of the bias member 31 by the distance indicated by arrow 43 of the drawing.

In FIG. 4c, when application of current to the drive member 17 has been suspended, the drive member 17 stops heat generation, and the drive member 17 gets back to the state shown in FIG. 4a by natural cooling through ambient air. The moving member 21 is shifted to the right by the biasing force of the bias member 31 by the distance indicated by the arrow 45 of the drawing, so that the moving member 21 gets back to the state of FIG. 4a. Repetition of the aforementioned procedure shifts the moving member 21 in the lateral direction.

In the SMA actuator having the aforementioned structure, the following technique has been proposed (e.g., Unexamined Japanese Patent Application Publication No. 2006-337533. The portion of the moving member in contact with the SMA is melted indirectly by heating the SMA at the portion in contact with the moving member, so that the SMA penetrates into that portion, whereby positions between the moving member of the SMA actuator and SMA are adjusted.

As schematically shown in FIG. 4c, the conventional SMA actuator has the following problem: A short circuit may be established between the protrusions 17a from the fixing portions 13 and 15, wherein these protrusions are the portions left behind after cutting the drive member 17 produced at the time of manufacturing the actuator. As a result, the drive current cannot be applied. Alternatively, a short circuit may be established with the circuit board such as the drive circuit of the SMA actuator (not illustrated). This may cause a trouble.

SUMMARY

An object of the present invention is to solve the aforementioned problems and to provide a method of stringing the SMA, method of manufacturing the SMA actuator, SMA actuator, and apparatus for manufacturing the SMA actuator wherein the aforementioned SMA protrusion 17a produced in the process of manufacturing the SMA actuator can be reduced.

In view of forgoing, one embodiment according to one aspect of the present invention is a method for stringing a shape memory alloy used as a drive member for moving a moving member, the method comprising the steps of:

extending the shape memory alloy between the moving member and a wire supporting member via a drive member supporting member;

fixing the shape memory alloy to the drive member supporting member; and melt-cutting the extended shape memory alloy by applying an electric current to a portion thereof between the drive member supporting member and the wire supporting member to heat the shape memory alloy up to a temperature not lower than a melting point thereof.

According to another aspect of the present invention, another embodiment is a method for manufacturing a shape memory alloy actuator, the method comprising the steps of:

extending a shape memory alloy between a moving member and a wire supporting member via a drive member supporting member;

fixing the shape memory alloy to the drive member supporting member; and melt-cutting the extended shape memory alloy by applying an electric current to a portion thereof between the drive member supporting member and the wire supporting member to heat the shape memory alloy up to a temperature not lower than a melting point thereof, wherein the shape memory alloy actuator includes:

the moving member which mounts thereon or engages a driven member to move the driven member;

a bias section which biases the moving member by a tensile force thereof;

the drive member supporting member, which is provided on a side opposite to the bias section with the moving member interposed therebetween; and a drive member which includes the shape memory alloy, the drive member being engaged with the moving member at a first portion of the drive member, being fixed to the driving member supporting member at a second portion of the driving member, and being for generating heat by energization to move the moving member against a biasing force of the bias section.

According to another aspect of the present invention, another embodiment is a shape memory alloy actuator, comprising:

a moving member which mounts thereon or engages a driven member to move the driven member;

a bias section which biases the moving member by a tensile force thereof;

a drive member supporting member which is provided on a side opposite to the bias section with the moving member interposed therebetween; and a drive member which includes the shape memory alloy, the drive member being engaged with the moving member at a first portion of the drive member, being fixed to the driving member supporting member at a second portion of the driving member, and being for generating heat by energization to move the moving member against a biasing force of the bias section, wherein the shape memory alloy actuator is manufactured by a method comprising the steps of:

extending a shape memory alloy between the moving member and a wire supporting member via the drive member supporting member;

fixing the shape memory alloy to the drive member supporting member; and melt-cutting the extended shape memory alloy by applying an electric current to a portion thereof between the drive member supporting member and the wire supporting member to heat the shape memory alloy up to a temperature not lower than a melting point thereof.

According to another aspect of the present invention, another embodiment is an apparatus for manufacturing a shape memory alloy actuator, comprising:

a wire extending section for extending a shape memory alloy between a moving member and a wire supporting member via a drive member supporting member; and a wire cutting section for melt-cutting the shape memory alloy by applying an electric current to a portion thereof between the drive member supporting member and the wire supporting member to heat the shape memory alloy up to a temperature not lower than a melting point thereof, wherein the shape memory alloy actuator comprises:

a moving member which mounts thereon or engages a driven member to move the driven member;

a bias section which biases the moving member by a tensile force thereof;

the drive member supporting member, which is provided on a side opposite to the bias section with the moving member interposed therebetween; and a drive member which includes the shape memory alloy, the drive member being engaged with the moving member at a first portion of the drive member, being fixed to the driving member supporting member at a second portion of the driving member, and being for generating heat by energization to move the moving member against a biasing force of the bias section, wherein the shape memory alloy actuator is manufactured by a method comprising the steps of:

extending a shape memory alloy between the moving member and the wire supporting member via the drive member supporting member;

fixing the shape memory alloy to the drive member supporting member; and melt-cutting the extended shape memory alloy by applying an electric current to a portion thereof between the drive member supporting member and the wire supporting member to heat the shape memory alloy up to a temperature not lower than a melting point thereof.

DETAILED DESCRIPTION OF THE PREFERRED EMBODIMENT

The following describes the present invention with reference to the embodiments shown in the diagrams, without the present invention being restricted thereto. The same or equivalent portions in the diagrams will be assigned with the same numerals of reference, and explanation will be omitted to avoid duplication.

Figure 1A:
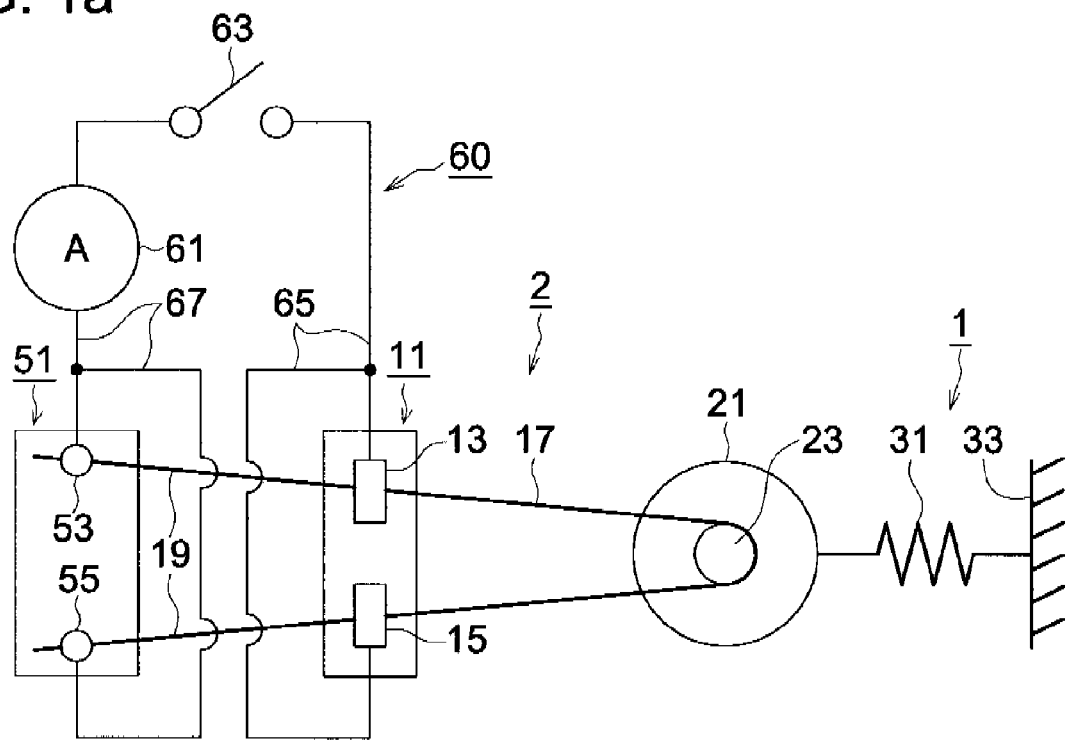
FIGS. 1a, 1b, 1c and 1d are schematic diagrams representing a first embodiment of a wire cutting section of an apparatus for manufacturing a SMA actuator of the present invention.
Figure 1B:
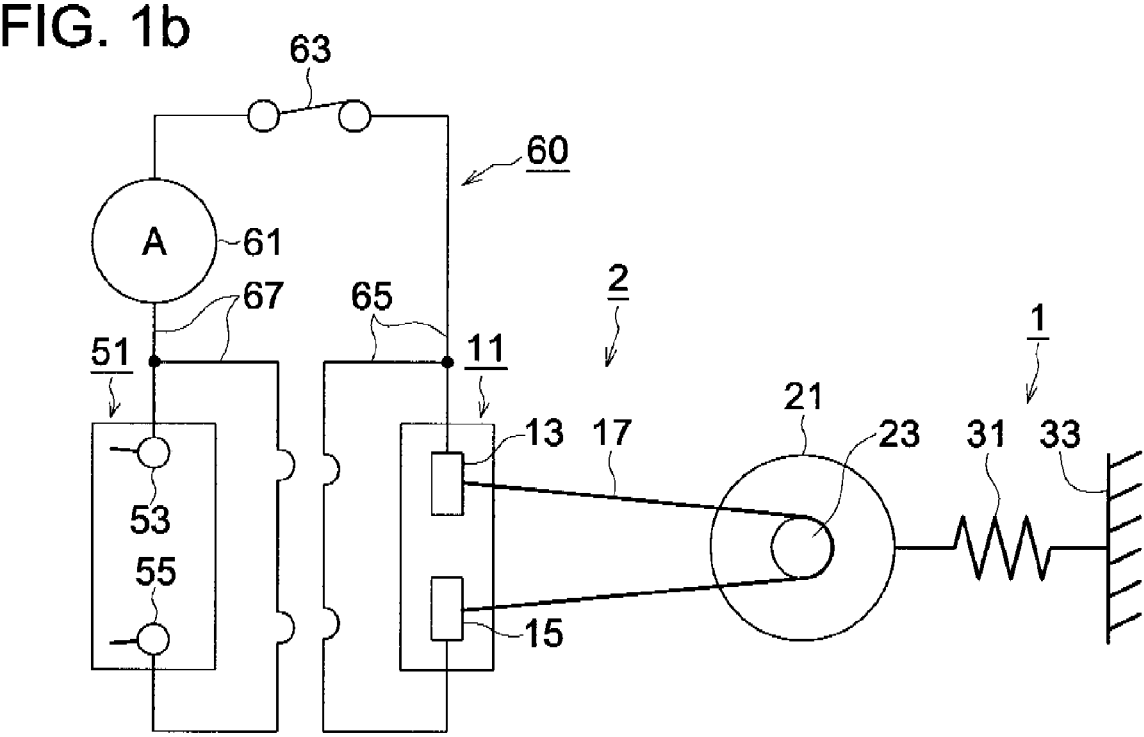

In the first place, a first embodiment of the present invention will be described with reference to FIGS. 1a and 1b. FIGS. 1a and 1b are the schematic diagrams representing a first embodiment of the wire cutting section 60 of the apparatus for manufacturing an SMA actuator 2. FIG. 1a shows the state before the SMA is cut off by melting, and FIG. 1b shows the state after having been cut off.

In FIG. 1a, a drive member 17 made up of an SMA wire is extended and hung on a protrusion 23 provided on a moving member 21 in the form of a letter U through fixing portions 13 and 15 as parts of a drive member supporting member 11. Both of the terminal ends of the drive member 17 are held by the holding members 53 and 55 on a wire supporting member 51 provided on the apparatus 2 for manufacturing the SMA actuator (step of extending the shape memory alloy) This is followed by the step of pulling the SMA wire 17 toward the left of the diagram, whereby a predetermined tension is applied thereto (step of applying a stretching force), and the moving member 21 is adjusted to a predetermined position. Under this condition, the drive member 17 is fixed on the fixing portions 13 and 15 on the drive member supporting member 11 (step of fixing). The holding members 53 and 55 as parts of the wire supporting member 51 serve as the wire extending sections of the present invention.

For example, the position of the moving member 21 is adjusted according to the technique disclosed in Patent Document 1 (the Unexamined Japanese Patent Application Publication No. 2006-337533). After that, the unnecessary portion of the SMA wire is trimmed off, whereby the SMA actuator is finished, as will be explained below.

A wire cutting section 60 is connected between the fixing portions 13 and 15 on the drive member supporting member 11 and the holding members 53 and 55 on the wire supporting member 51. The wire cutting section 60 includes a wiring 67, current source 61, switch 63 and wiring 65 which are connected in series. In the fixing portions 13 and 15 and the holding members 53 and 55, at least the connection points with the wire cutting section 60 and the connection point with the drive member 17 made up of the SMA wire are made of a conductive material such as a metal.

In FIG. 1b, when the switch 63 is turned on, the current enough for generating joule heat which heats the SMA wire up to not less than the melting point of the SMA wire is applied from the current source 61 to portions 19 of the drive member 17 sandwiched between the fixing portions 13 and the holding member 53, and sandwiched between the fixing portions 15 and holding member 55. Thus, the portion 19 sandwiched between the fixing portions 13 of the drive member 17 and the holding member 53, and the portion 19 sandwiched between the fixing portions 15 and holding member 55 are cut off by melting by this operation. The protrusion left behind after cutting is smaller than that when they have been cut off by a cutter (Step of melt-cutting). After cutting by melting, the current is blocked. Thus, there is no more heat generation.

In this case, if fixing portions 13 and 15 are provided with such a large heat capacity that the heat generated at the portion 19 of the drive member 17 to be cut off by melting is not transferred to the portions of the drive member 17 from the fixing portions 13 and 15 to the protrusion 23, cutting can be achieved without the drive member 17 of the SMA actuator 1 being deteriorated or adversely affected. The specific value for the current flowing to the drive member 17 for cutting by melting can be optimally selected in conformity to particular conditions. For example. If the diameter of the SMA wire is several tens of microns, the current for cutting by melting is preferably about 200 mA. In short, the preferable current value should be such that the unnecessary portion of the SMA can be substantially removed by melt-cutting. To be substantially removed means that the length of the protrusion 17a remaining on the fixing portions 13 and 15 or holding members 53 and 55 after cutting by melting is not long enough to for the protrusion 17a to contact other conductive portions or the other protrusion 17a. To put it more specifically, this length does not exceeding 40% of the unnecessary section (the section between the fixing portion 13 and holding member 53 of FIG. 1a), preferably it does not exceed 20%, more preferably it does not exceed 10%.

As compared to the method of using a cutter for physically cutting, the first embodiment ensures instant melt-cutting by applying the optimum current to the SMA wire, and therefore, reduces the cutting time. Further, cutting is performed without physical contact with the SMA wire, and therefore, this method does not require any space for cutter to be inserted between the drive member supporting member 11 and wire supporting member 51. This arrangement makes a significant contribution to downsizing the apparatus 2 for manufacturing the SMA actuator. Further, the most of the SMA wire up to the fixing portions 13 and 15 can be cut off by melting. This reduces the size of the protrusion 17a left behind after cutting, and reduces the possibility of a short circuit being caused by the remainder left behind after cutting.

The aforementioned first embodiment has been described with reference to the structure of the actuator of FIGS. 1a and 1b. The above description also applies to the structure of the actuator of FIGS. 1c and 1d.

Figure 1C:
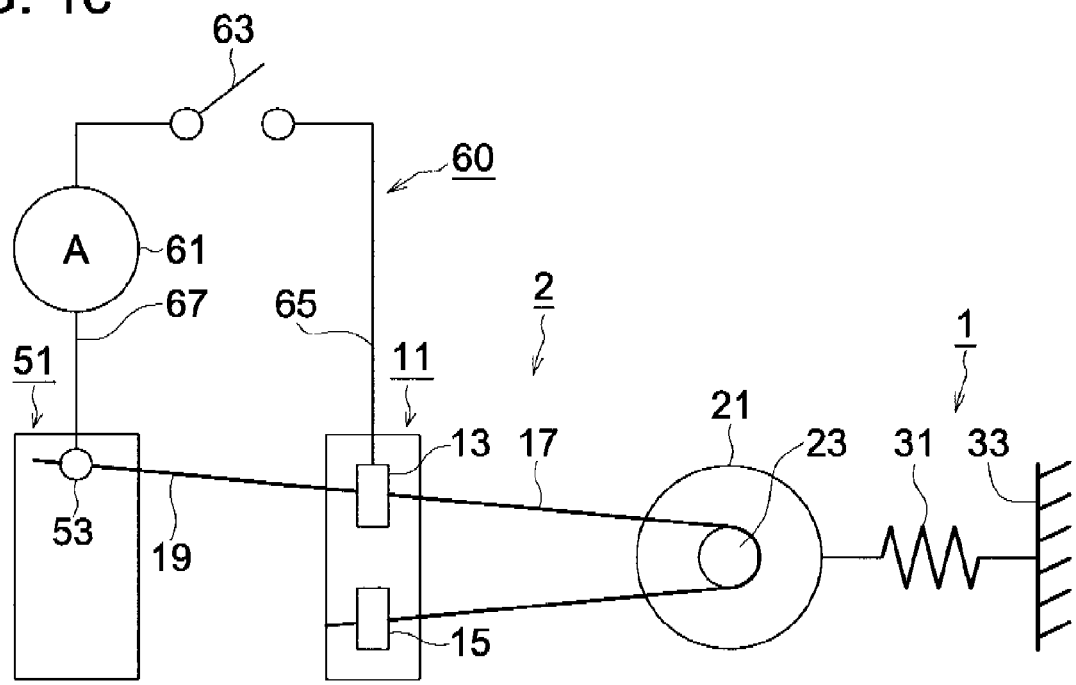

In FIG. 1c, one end of the SMA wire 17 is secured to the fixing portions 15 as part of the drive member supporting member 11, from the beginning, unlike the cases of FIGS. 1a and 1b. The other end of the SMA wire 17 is held by the holding member 53 on the wire supporting member 51 arranged on the apparatus 2 for manufacturing the SMA actuator through the fixing portions 13 as part of the drive member supporting member 11, where the SMA wire is extended to the protrusion 23 provided on the moving member 21 in the form of letter U (step of extending). This is followed by the step of the other end of the SMA wire 17 being pulled to the left in the drawing (step of applying a stretching force), whereby the moving member 21 is adjusted to a predetermined position. Under this condition, the SMA wire 17 is fixed to the fixing portions 13 on the drive member supporting member 11 (step of fixing). After that, the switch 63 is closed and the unnecessary portion of the SMA wire 17 is then melted and cut off, as described with reference to FIGS. 1a and 1b (step of melt-cutting).

Figure 1D:
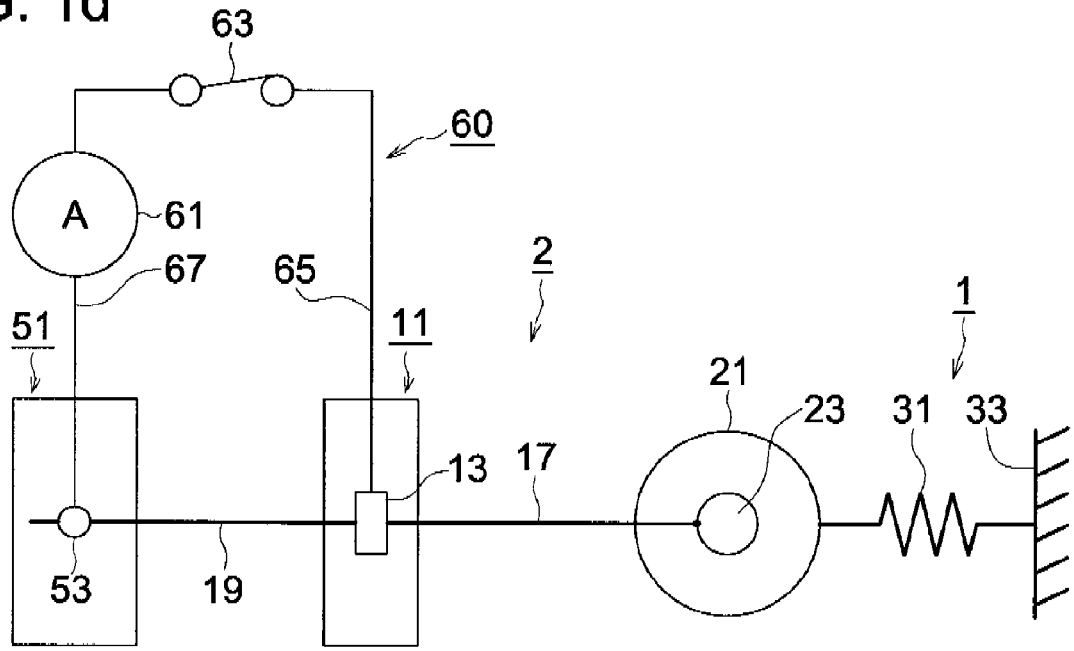

In FIG. 1d, similarly to the case of the Unexamined Japanese Patent Application Publication No. 2006-337533, by heating the SMA wire to melt the portion of the moving member in contact with the SMA wire, the SMA wire is penetrated insides, whereby one end of the SMA is fixed to the moving member. The other end of the SMA wire is held by the holding member 53 on the wire supporting member 51 through the fixing portions 13 of the drive member supporting member 11 (step pf extending). This is followed by the step of the other end of the SMA wire 17 being pulled to the left in the drawing (step of applying a stretching force), and the moving member 21 is adjusted to a predetermined position. Under this condition, the SMA wire 17 is fixed to the fixing portions 13 on the drive member supporting member 11 (step of fixing). After that, the switch 63 is closed and the unnecessary portion of the SMA wire 17 is then melted and cut off, as described with reference to FIGS. 1a and 1b (step of melt-cutting).

Figure 2A:
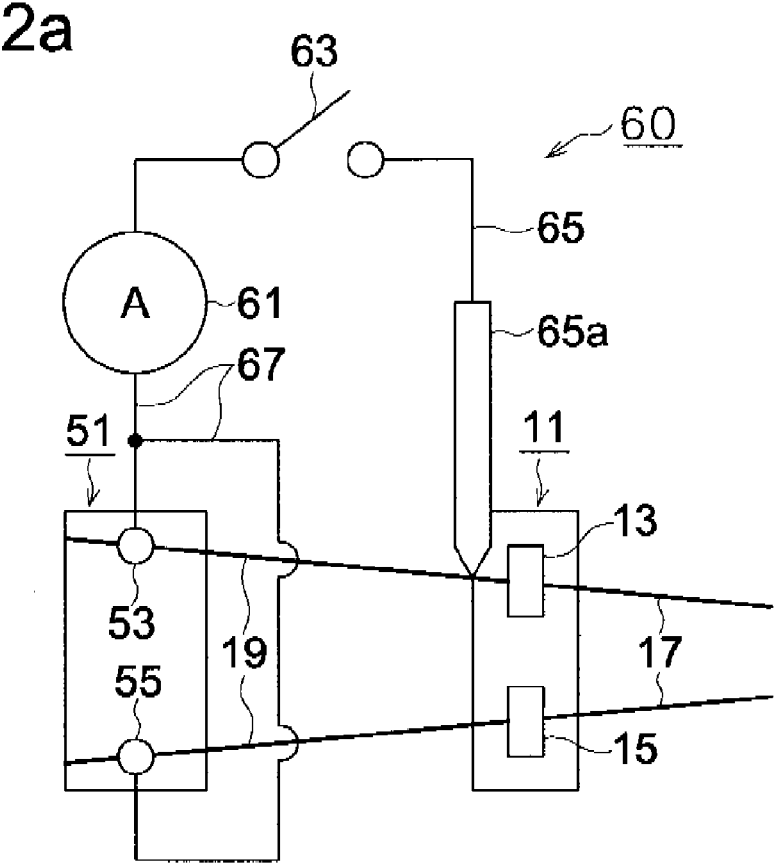
FIGS. 2a and 2b are schematic diagrams representing a second embodiment of a wire cutting section of an apparatus for manufacturing a SMA actuator in the present invention.
Figure 2B:
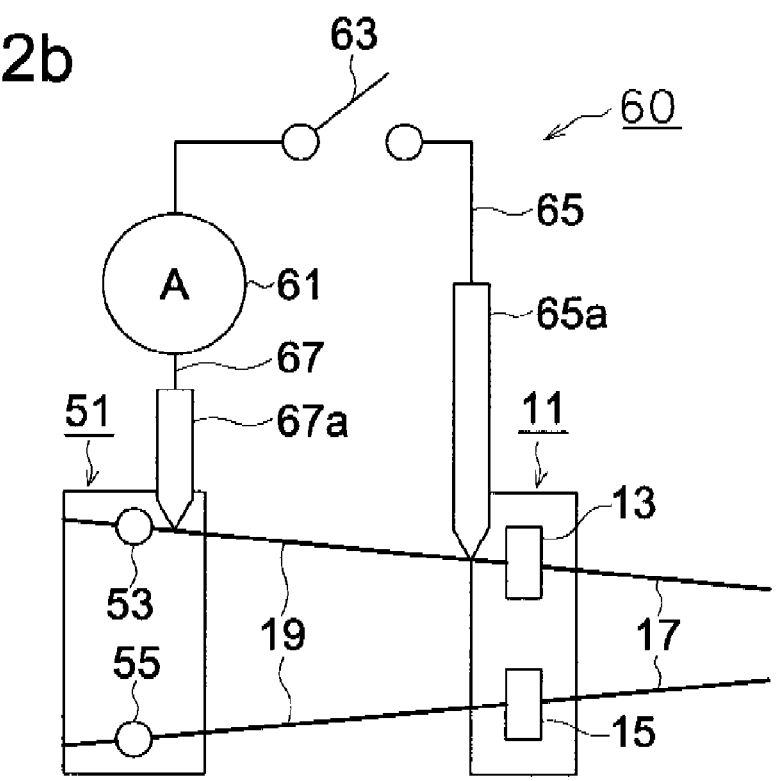

The following describes a second embodiment of the present invention with reference to FIGS. 2a and 2b:

FIGS. 2a and 2b are schematic diagrams representing the second embodiment of a wire cutting section 60 of an apparatus 2 for manufacturing the SMA actuator. FIG. 2a shows the case wherein only a wiring 65 has an electrode for melt-cutting, while FIG. 2b shows the case wherein both the wirings 65 and 67 are provided with electrodes for melt-cutting.

In FIG. 2a, the wire cutting section 60 has a melt-cutting electrode 65a, on the side of the wiring 65, to be used in contact with the portion 19 of the drive member 17 to be cut off by melting, instead of using the fixing portions 13 and 15 as electrodes. In the cutting operation, the melt-cutting electrode 65a for is moved to be alternately contacted with the two portions 19 to be cut off by melting, whereby current enough for melt-cutting is applied between the melt-cutting electrode 65a, and the holding members 53 or 55 on the wire supporting member 51, consequently the cutting is achieved. This arrangement allows the drive member 17 to be cut at a desired position on the side of the fixing portion 13 or 15 on the drive member supporting member 11. Cutting can also be achieved when the fixing portions 13 and 15 are made of resin or other non-conductive material, or the fixing portions 13 and 15 cannot be used as electrodes because electric contact cannot be physically established between the wire cutting section 60 and fixing portions 13 and 15.

In FIG. 2b, the wire cutting section 60 has the melt-cutting electrode 67a to be used in contact with the portion 19 of the drive member 17 to be cut off by melting, on the wiring 67 as well, in addition to the arrangement of FIG. 2a, and current enough for melt-cutting is applied between the melt-cutting electrodes 65a and 67a. Thus, the drive member 17 can be melted and cut off at a desired position between the drive member supporting member 11 and wire supporting member 51 by moving the melt-cutting electrodes 65a and 67a. This arrangement also permits cutting to be performed even when the fixing portions 13 and 15, and holding members 53 and 55 cannot be used as electrodes.

Similarly to the case of the first embodiment, the aforementioned second embodiment has been described with reference to the actuator arrangement shown in FIGS. 1a and 1b. The description also applies to the arrangement shown in FIGS. 1c and 1d.

Figure 3A:
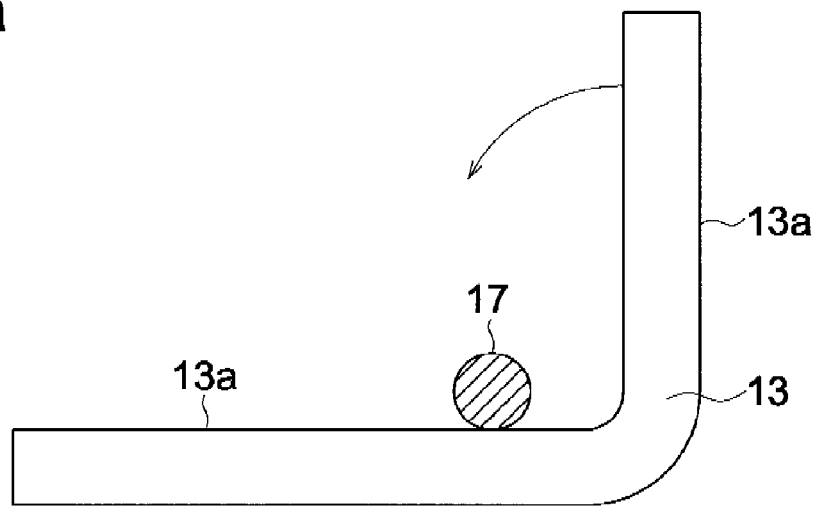
FIGS. 3a, 3b, 3c and 3d are schematic diagrams representing an example of a method of fixing the drive member at the fixing portion preferably used in the present embodiment.
Figure 3B:
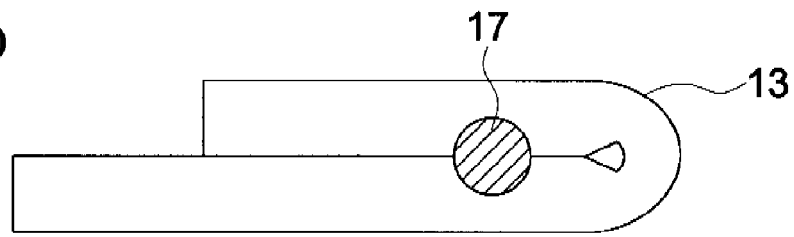
Figure 3C:
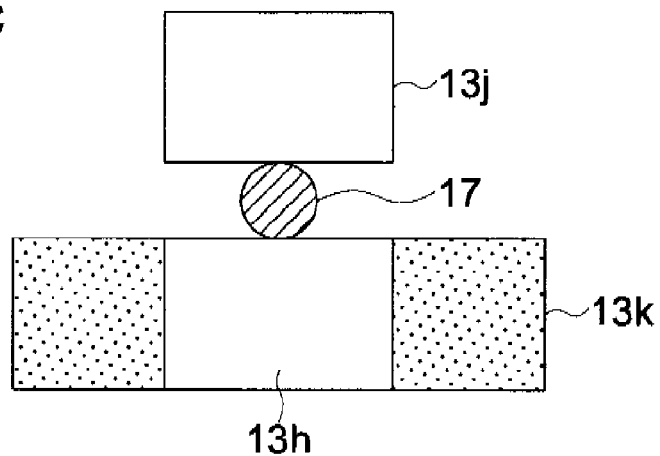
Figure 3D:
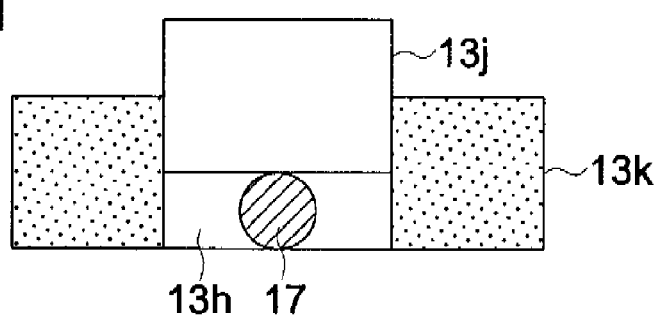
Figure 4A:
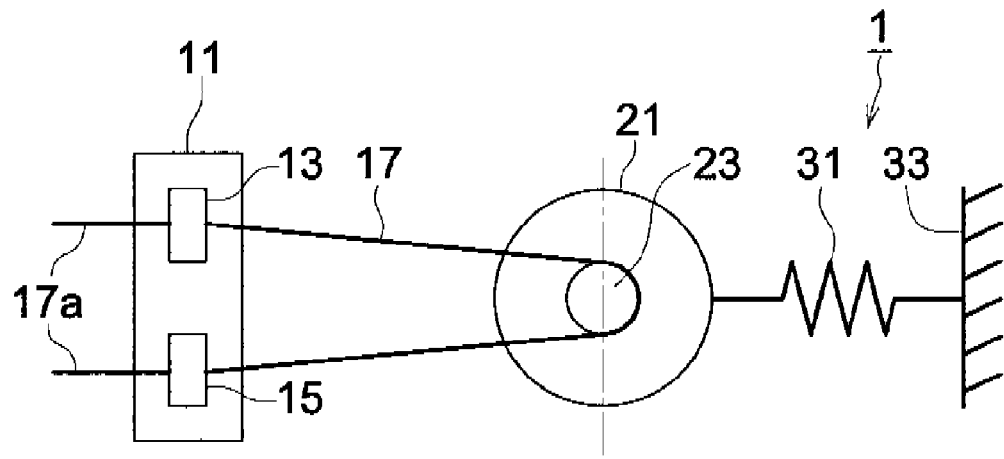
FIGS. 4a, 4b and 4c are schematic diagrams showing a basic arrangement and operation of a conventional SMA actuator.
Figure 4B:
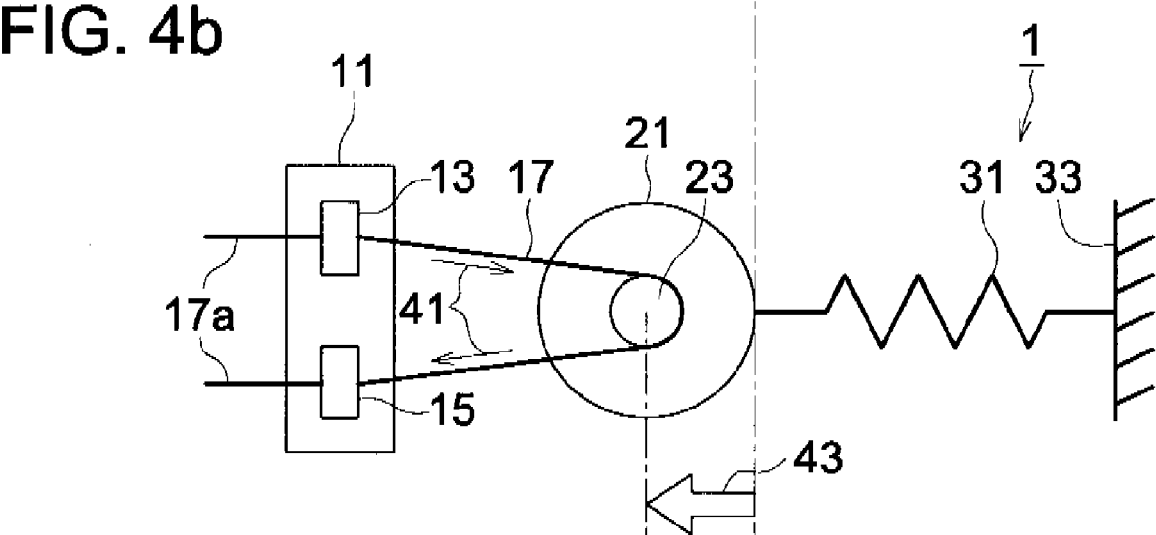
Figure 4C:
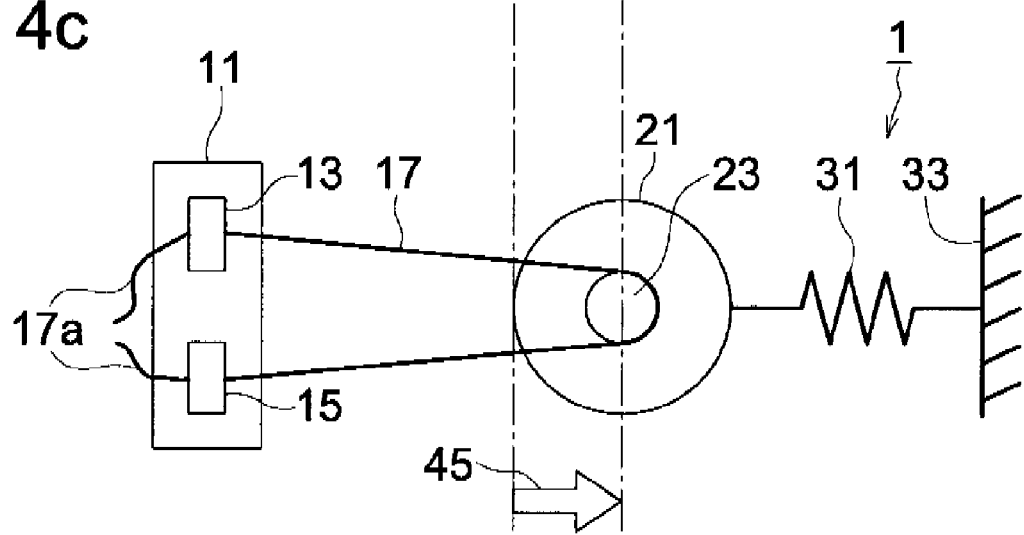

The following describes an example of the method of fixing the drive member 17 at the fixing portions 13 and 15 with reference to FIGS. 3a, 3b, 3c and 3d:

FIGS. 3a, 3b, 3c and 3d are schematic diagrams representing an example of the method of fixing the drive member 17 at the fixing portions 13 and 15 preferably used in the present embodiment. FIGS. 3a and 3b show the method of fixing by staking, and FIGS. 3c and 3d show the method of fixing by press-fitting.

In FIGS. 3a and 3b, a drive member 17 is placed on a flat metal panel 13. One end 13a of the flat metal panel 13 is folded on the other side 13b, and pressure applied from the rear of the end 13a to the end 13b, whereby the drive member 17 is pushed inside, and thus fixing is performed by staking. This procedure ensures stable fixing, and is preferably employed for fixing.

It goes without saying that fixing can be performed by press-fitting the drive member 17 into a press-fitting hole 13h of a press-fitting member 13k, using a press-fitting pin 13j, as shown in FIGS. 3c and 3d.

As described above, the present invention provides a method of stringing an SMA, method of manufacturing the SMA actuator, SMA actuator, and apparatus for manufacturing the SMA actuator wherein the drive member made up of an SMA is extended between the moving member and drive member supporting member, and current is then applied to the unnecessary portion of the drive member to cut it off by melting, with the result that the size of the protrusion left behind after cutting of the SMA can be reduced. It also provides a method of stringing an SMA, method of manufacturing the SMA actuator, SMA actuator, and apparatus for manufacturing the SMA actuator wherein use of the method of melting and cutting eliminates the need of giving consideration to the durability of the cutter to be used, and removes the need of providing a space for cutter to be inserted, whereby the apparatus for manufacturing the SMA actuator can be downsized.

Further, it is to be expressly understood, that the method of stringing an SMA, method of manufacturing the SMA actuator, SMA actuator, as well as the details of the structure and operation of the components used in the apparatus for manufacturing the SMA actuator in the present invention can be embodied in a great number of variations with appropriate modification or additions, without departing from the technological spirit and scope of the invention claimed.

What is claimed is:

1. A method for stringing a shape memory alloy used as a drive member for moving a moving member, the method comprising the steps of:
   extending the shape memory alloy between the moving member and a wire supporting member via a drive member supporting member;
   fixing the shape memory alloy to the drive member supporting member; and
   melt-cutting the extended shape memory alloy by applying an electric current to a portion thereof between the drive member supporting member and the wire supporting member to heat the shape memory alloy up to a temperature not lower than a melting point thereof.

2. The method of claim 1, wherein the fixing step includes the step of:
   applying a stretching force to the shape memory alloy so as to pull the moving member toward the drive member supporting member,
   wherein in the fixing step, the shape memory alloy is fixed to the drive member supporting member with the stretching force applied to the shape memory alloy.

3. A method for manufacturing a shape memory alloy actuator, the method comprising the steps of:
   extending a shape memory alloy between a moving member and a wire supporting member via a drive member supporting member;
   fixing the shape memory alloy to the drive member supporting member; and
   melt-cutting the extended shape memory alloy by applying an electric current to a portion thereof between the drive member supporting member and the wire supporting member to heat the shape memory alloy up to a temperature not lower than a melting point thereof,
   wherein the shape memory alloy actuator includes:
   the moving member which mounts thereon or engages a driven member to move the driven member;
   a bias section which biases the moving member by a tensile force thereof;
   the drive member supporting member, which is provided on a side opposite to the bias section with the moving member interposed therebetween; and
   a drive member which includes the shape memory alloy, the drive member being engaged with the moving member at a first portion of the drive member, being fixed to the driving member supporting member at a second portion of the driving member, and being for generating heat by energization to move the moving member against a biasing force of the bias section.

4. The method of claim 3, wherein the fixing step includes the step of:
   applying a stretching force to the shape memory alloy so as to pull the moving member toward the drive member supporting member,
   wherein in the fixing step, the shape memory alloy is fixed to the drive member supporting member with the stretching force applied to the shape memory alloy.

5. A shape memory alloy actuator, comprising:
   a moving member which mounts thereon or engages a driven member to move the driven member;
   a bias section which biases the moving member by a tensile force thereof;

a drive member supporting member which is provided on a side opposite to the bias section with the moving member interposed therebetween; and a drive member which includes the shape memory alloy, the drive member being engaged with the moving member at a first portion of the drive member, being fixed to the driving member supporting member at a second portion of the driving member, and being for generating heat by energization to move the moving member against a biasing force of the bias section, wherein the shape memory alloy actuator is manufactured by a method comprising the steps of:

extending a shape memory alloy between the moving member and a wire supporting member via the drive member supporting member;

fixing the shape memory alloy to the drive member supporting member; and melt-cutting the extended shape memory alloy by applying an electric current to a portion thereof between the drive member supporting member and the wire supporting member to heat the shape memory alloy up to a temperature not lower than a melting point thereof.

6. The shape memory alloy actuator of claim 5, wherein the fixing step includes the step of:

applying a stretching force to the shape memory alloy so as to pull the moving member toward the drive member supporting member, wherein in the fixing step, the shape memory alloy is fixed to the drive member supporting member with the stretching force applied to the shape memory alloy.

7. An apparatus for manufacturing a shape memory alloy actuator, comprising:

a wire extending section for extending a shape memory alloy between a moving member and a wire supporting member via a drive member supporting member; and a wire cutting section for melt-cutting the shape memory alloy by applying an electric current to a portion thereof between the drive member supporting member and the wire supporting member to heat the shape memory alloy up to a temperature not lower than a melting point thereof, wherein the shape memory alloy actuator comprises:

a moving member which mounts thereon or engages a driven member to move the driven member;

a bias section which biases the moving member by a tensile force thereof;

the drive member supporting member, which is provided on a side opposite to the bias section with the moving member interposed therebetween; and a drive member which includes the shape memory alloy, the drive member being engaged with the moving member at a first portion of the drive member, being fixed to the driving member supporting member at a second portion of the driving member, and being for generating heat by energization to move the moving member against a biasing force of the bias section, wherein the shape memory alloy actuator is manufactured by a method comprising the steps of:

extending a shape memory alloy between the moving member and the wire supporting member via the drive member supporting member;

fixing the shape memory alloy to the drive member supporting member; and melt-cutting the extended shape memory alloy by applying an electric current to a portion thereof between the drive member supporting member and the wire supporting member to heat the shape memory alloy up to a temperature not lower than a melting point thereof.

8. The apparatus of claim 7, wherein the fixing step includes the step of:

applying a stretching force to the shape memory alloy so as to pull the moving member toward the drive member supporting member, wherein in the fixing step, the shape memory alloy is fixed to the drive member supporting member with the stretching force applied to the shape memory alloy.

* * * * *